United States Patent
Hoffner et al.

(10) Patent No.: US 12,439,357 B2
(45) Date of Patent: Oct. 7, 2025

(54) SYSTEMS AND METHODS FOR DYNAMIC REGISTRATION MANAGEMENT IN ENHANCED CORE NETWORKS

(71) Applicant: Verizon Patent and Licensing Inc., Basking Ridge, NJ (US)

(72) Inventors: Barry F. Hoffner, Bridgewater, NJ (US); Lixia Yan, Basking Ridge, NJ (US); James E. Haley, Aston, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 341 days.

(21) Appl. No.: 18/186,261

(22) Filed: Mar. 20, 2023

(65) Prior Publication Data
US 2024/0323886 A1 Sep. 26, 2024

(51) Int. Cl.
*H04W 60/00* (2009.01)
*H04W 28/04* (2009.01)

(52) U.S. Cl.
CPC ........... *H04W 60/00* (2013.01); *H04W 28/04* (2013.01)

(58) Field of Classification Search
CPC ....... H04W 60/00; H04W 28/04; H04W 8/20; H04W 12/06; H04W 12/08; H04W 12/082; H04W 60/04
See application file for complete search history.

(56) References Cited

U.S. PATENT DOCUMENTS

| 11,889,391 B2* | 1/2024 | Shan | H04W 12/08 |
| 2022/0086741 A1* | 3/2022 | Liao | G08G 5/26 |
| 2025/0016208 A1* | 1/2025 | Wang | H04L 69/322 |

OTHER PUBLICATIONS

Mantha, Ravi Shankar, and Irfan Ali. "Hosted Services Support in 5G Networks." (2022). (Year: 2022).*

* cited by examiner

*Primary Examiner* — Sharad Rampuria

(57) ABSTRACT

Systems and methods are provided to enable operators to dynamically reject user equipment (UE) registrations for 5G networks based on certain policy criteria. A network device in a core network receives a registration request for a UE device, retrieves access and mobility subscription data for the UE device, and submits a policy association request message to an Access Management-Policy Control Function (AM-PCF). The policy association request message includes the access and mobility subscription data. The network device receives a policy association response message from the AM-PCF, determines whether the policy association response message includes an error code for a failed access management policy association, and rejects the registration request when the policy association response message includes the error code.

20 Claims, 7 Drawing Sheets

SYSTEMS AND METHODS FOR DYNAMIC REGISTRATION MANAGEMENT IN ENHANCED CORE NETWORKS

BACKGROUND INFORMATION

Wireless communication service providers continue to develop and expand available services and their delivery networks. An enhanced core network deployment technique for use in a Fifth Generation (5G) Standalone (SA) architecture may enable separation of access management functionality from session management functionality. That is, user equipment (UE) access management policy control function (AM-PCF), discrete packet data unit (PDU) session management PCF (SM-PCF), and UE access selection and PDU session-related PCF (UE-PCF), may be handled independently. Wireless communication service providers are continuing to develop more efficient use of these separate functions.

DETAILED DESCRIPTION OF EXAMPLE EMBODIMENTS

Figure 1:
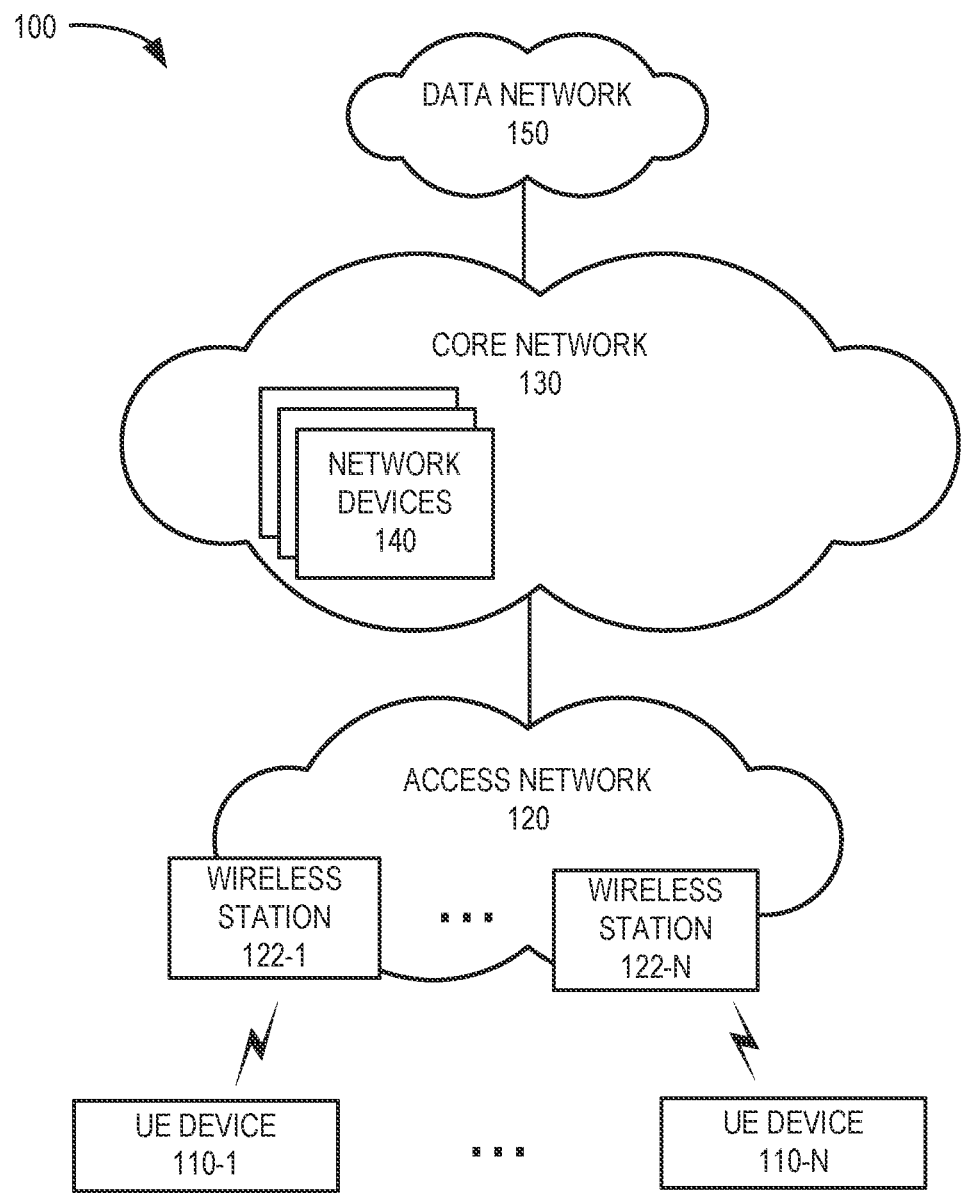
FIG. 1 illustrates an example environment in which systems and methods described herein may be implemented.

The following detailed description refers to the accompanying drawings. The same reference numbers in different drawings may identify the same or similar elements.

Systems and methods described herein enable operators to dynamically reject user equipment (UE) registrations for 5G networks based on certain policy criteria. More particularly, the systems and methods allow mobile network operators (MNOs) to use an Access and Mobility Management Function (AMF) and an access management Policy Control Function (AM-PCF) to dynamically manage UE device registrations.

When a 5G subscriber powers up a 5G-enabled UE device in a 5G standalone (SA) network, the UE device performs a registration procedure with the 5G network. When a registration request is received from the UE device, an AMF in the core network performs a number of steps. First, the AMF performs an authentication procedure. Next, the AMF retrieves access and mobility subscription data from a Unified Data Management (UDM) function and/or a Unified Data Repository (UDR). Finally, the AMF performs access management policy association with an AM-PCF.

If there is a failure for either of these first two steps (i.e., the authentication procedure or the access and mobility subscription data retrieval), the AMF will reject the registration request. However, if the first two steps are successful, the AMF will allow the UE registration to continue regardless of the result of the third step (i.e., the AM policy association). Even if the AM-PCF responds to the AMF with a hypertext transfer protocol (HTTP) error code and problem details, the AMF will ignore it and allow the UE registration to continue if the first two registration steps were successful-which may not be desirable. Current 5G network standards do not define a mechanism to allow the AM-PCF to control the registration result.

Under current standards, to reject UE device registration for a group, a MNO must perform provisioning for individual UE devices, which is a tedious and slow process and not preferable for enforcing temporary policies. There may be situations where the MNO would like to quickly manage UE device registrations. For example, the MNO may want to temporarily block the registration of a group of enterprise subscribers due to misbehaviors. As another example, the MNO may want to force a group of 5G subscribers to a 4G LTE network due to a 5G network outage. Currently, there is no mechanism for operators to dynamically reject the UE registration based on certain criteria.

According to implementations described herein a 5G UE device registration process may be dynamically updated to reflect an operator policy. In one implementation, a network device (e.g., an AMF) in a core network receives a registration request for a UE device, retrieves access and mobility subscription data for the UE device, and submits a policy association request message to an AM-PCF. The policy association request message includes the access and mobility subscription data. The network device receives a policy association response message from the AM-PCF, determines whether the policy association response message includes an error code for a failed access management policy association, and rejects the registration request when the policy association response message includes the error code.

FIG. 1 is a diagram illustrating an exemplary environment 100 in which systems and methods described herein may be implemented. Referring to FIG. 1, environment 100 includes UE devices 110-1 through 110-N, access network 120, wireless stations 122-1 through 122-N, core network 130, network devices 140 and data network 150.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IoT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as techniques for establishing wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G Radio Access Network (RAN) communicating via mmWave technology, a 5G RAN communicating via C-band technology or other types of 5G networks. Access network 120 may also include a 4G RAN.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNB)) or a 6G base station that communicates wirelessly with UEs 110 located within the radio frequency range of wireless station 122.

Core network 130 may include one or more wired, wireless, and/or optical networks that are capable of receiving and transmitting data (e.g., voice and/or video) and signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an AMF, a Session Management Function (SMF), a UDM function, a UDR, a Policy Control Function (PCF), an AM-PCF, a session management-PCF (SM-PCF), an Authentication Server Function (AUSF), a Charging Function (CHF), a Network Exposure Function (NEF), an application function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. A typical environment may include more or fewer devices than illustrated in FIG. 1. For example, environment 100 may include a large number (e.g., thousands or more) of UE devices 110 and wireless stations 122, as well as multiple access networks 120, core networks 130 and data networks 150. Environment 100 may also include elements such as gateways, monitoring devices, network functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
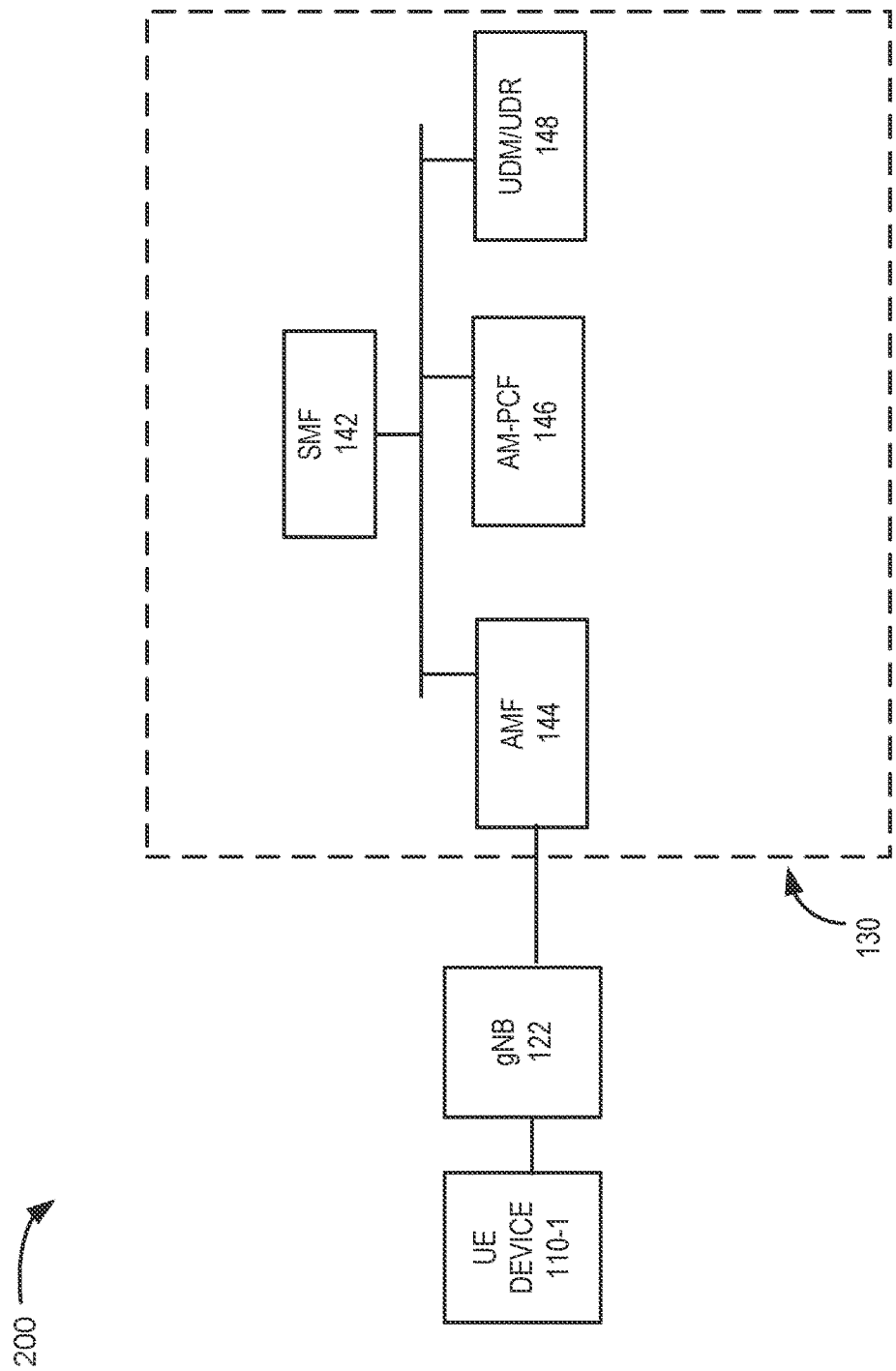
FIG. 2 is a block diagram of components implemented in the environment of FIG. 1 in accordance with an implementation.

FIG. 2 illustrates a portion 200 of environment 100, including elements in core network 130, in accordance with an implementation. Referring to FIG. 2, network devices 140 in core network 130 include SMF 142, AMF 144, AM-PCF 146, and a Unified Data Management (UDM) and/or a Unified Data Repository (UDR) (referred to herein as UDM/UDR 148). Core network 130 may include other elements/functions, such as a UPF, PCF, NEF, etc., and/or differently arranged elements. Network portion 200 also includes UE device 110-1 and wireless station 122 (depicted as gNB 122). As illustrated in FIG. 2, UE device 110-1 may connect to core network 130 via wireless station 122, shown in FIG. 2 as gNB 122.

SMF 142 may perform session establishment, session modification, and/or session release; perform Internet Protocol (IP) address allocation and management; perform Dynamic Host Configuration Protocol (DHCP) functions; perform selection and control of a UPF (not shown); configure traffic steering at the UPF to guide the traffic to the correct destinations; terminate interfaces toward a PCF (not shown); perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data.

AMF 144 may perform registration management, connection management, reachability management, mobility management, lawful intercepts, Short Message Service (SMS) transport between UE device 110 and other network functions, session management messages transport between UE device 110 and SMF 142, access authentication and authorization, location services management, functionality to support non-3GPP access networks, and/or other types of management processes.

After performing initial authentication procedures for UE 110 and retrieving access and mobility subscription data from UDM/UDR 148, AMF 144 may send a policy association request message to AM-PCF 146 to create a policy association and retrieve the UE policy and/or AM control policy. In one implementation, the policy association request message may be provided via an Npcf interface. Such a request may include various UE-related and/or subscriber information, such as its subscription permanent identifier (SUPI), Internal Group identifier, subscription notification indication, Service Area Restrictions, RAT/frequency selection priority (RFSP) index, Allowed network slice selection assistance information (NSSAI), general public subscription identifier (GPSI), Access Type and RAT, permanent equipment identifier (PEI), time zone, a UE Policy Container (i.e., a list of stored public subscription identifiers), and/or other data obtained from UDM/UDR 148.

When there is a failed policy association, AMF 144 may receive from AM-PCF 146 an HTTP error message (e.g., HTTP/2, HTTP/3, HTTPS, etc.) that includes an error code with problem details for the failed AM policy association. According to implementations described herein, AMF 144 may include a data structure to map error codes received from AM-PCF 146 to NAS error codes for use by UE devices 110. For example, AMF 144 may include an error code mapping table. The error code mapping table may be used to map HTTP error codes received from AM-PCF 146 with NAS cause codes for UE devices 110. For example, upon receiving a policy association response message from AM-PCF 146, AMF 144 may perform error code mapping to match the HTTP error message to a corresponding NAS error message for UE device 110-1. AMF 144 may convert the HTTP error message to an NAS message for forwarding toward UE device 110-1.

AM-PCF 146 may include a split core network device. A split core network device deployment enables separation of access management functionality from session management functionality. A split core PCF function may include, for example, an AM PCF 146, a discrete packet data unit (PDU) session management PCF (SM-PCF), and a UE access selection and PDU session-related PCF (UE-PCF). SM-PCF and UE-PCF are not shown in FIG. 2 for simplicity. AM-PCF 146 may perform access management functions, as well as some policy control functions. AM-PCR 146 may be provisioned, for example, with a group access management policy, such as a policy for an enterprise, a policy for UE devices with a certain operating system, a policy for a certain UE device type, etc.

According to an implementation, AM-PCF 146 may confirm or override access and mobility (AM) subscription data that an AMF (e.g., AMF 144) obtains from UDM/UDR 148. For example, AM-PCF 146 may receive a policy association request message from AMF 144 and respond with a policy association response message based on the previously-provisioned access management policies. The policy association response may include a policy decision regarding the type of wireless access UE device 110 may granted, such as 5G millimeter (mm) wave access, a 5G C-band access, a 4G Long Term Evolution (LTE) access, etc.

UDM/UDR 148 may maintain subscription information for UE devices 110, manage subscriptions, generate authentication credentials, handle user identification, perform access authorization based on subscription data, perform network function (NF) registration management, maintain service and/or session continuity by maintaining assignment of SMF 142 for ongoing sessions, and/or perform other processes associated with managing user data. According to implementations described herein, UDM/UDR 148 may provide access and mobility subscription data to AMF 144 as part of a UE registration process.

Network portion 200 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
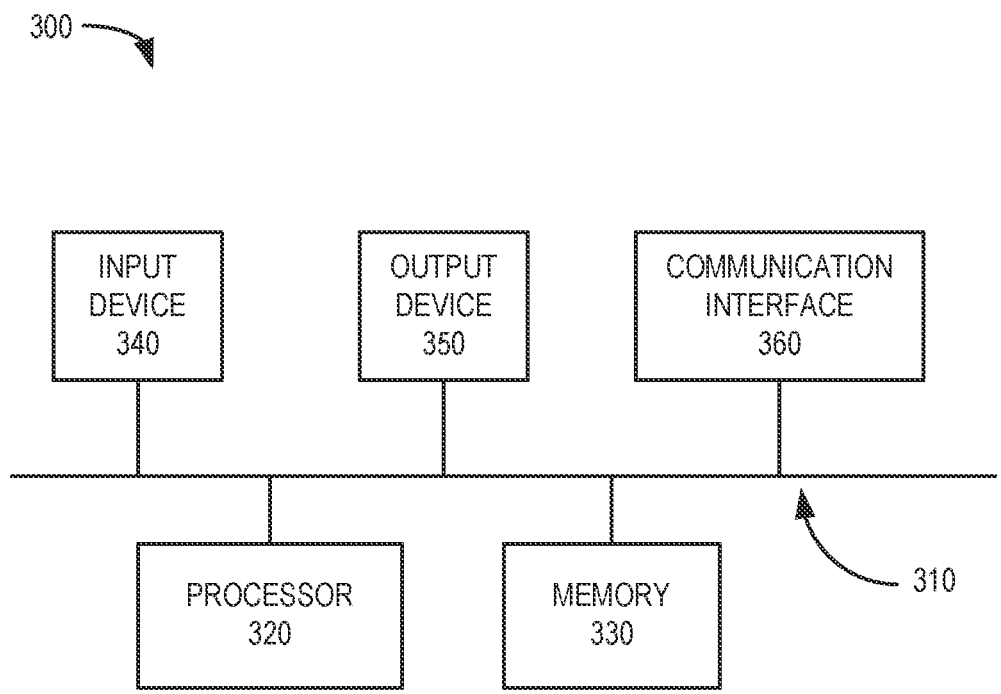
FIG. 3 illustrates logic components implemented in one or more of the devices described herein in accordance with an exemplary implementation.

FIG. 3 illustrates an exemplary configuration of a device 300. One or more devices 300 may correspond to or be included in devices in environment 100, such as UE device 110, wireless station 122, network devices 140, such as SMF 142, AMF 144, AM-PCF 146, PCF 148 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. Device 300 may include more or fewer components than illustrated in FIG. 3.

Bus 310 may provide communication paths between components of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
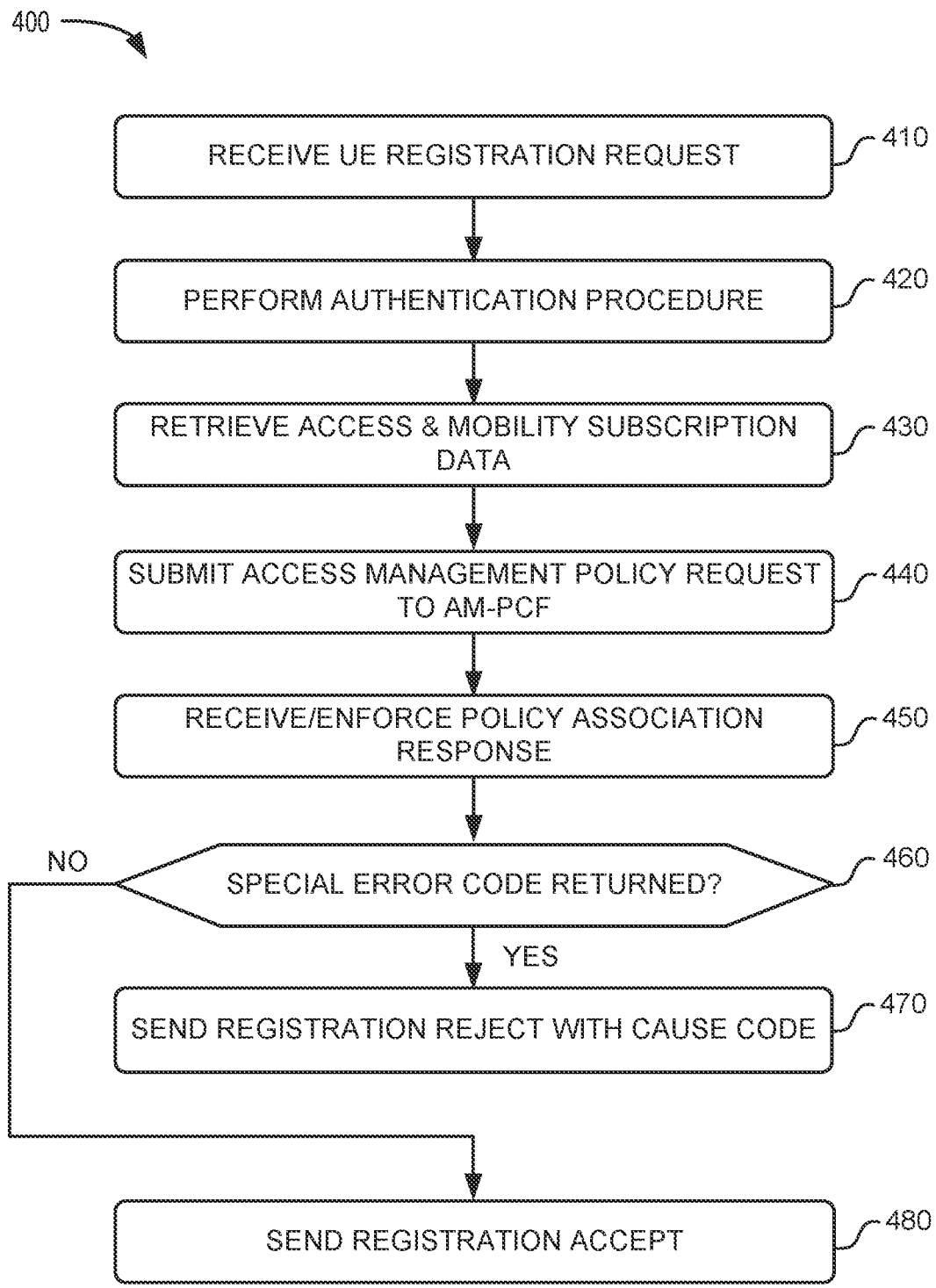
FIG. 4 is a flow diagram illustrating processing associated with generating an access management decision for a registration process, in accordance with an implementation.
Figure 5A:
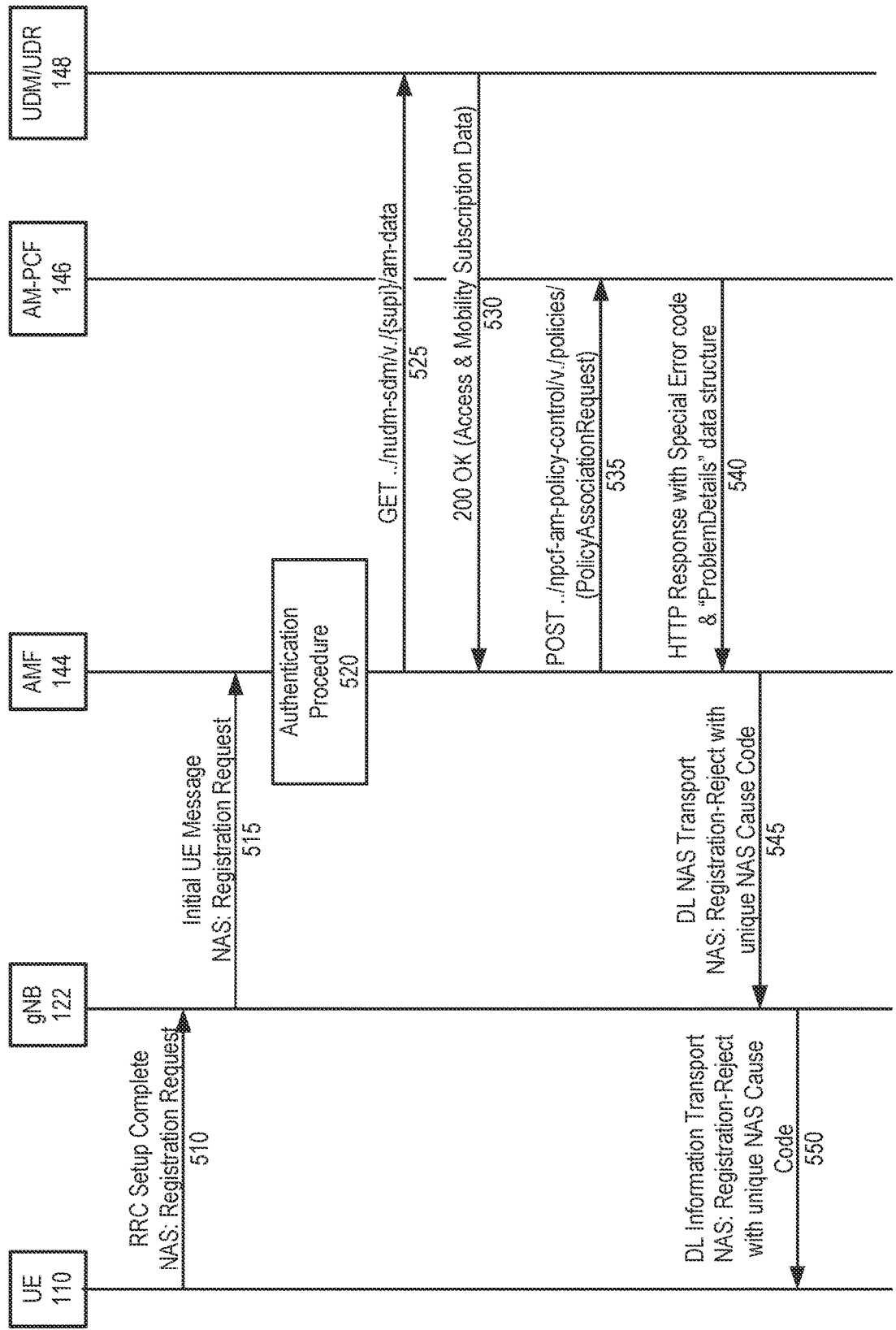
FIGS. 5A and 5B are example signal flow diagrams associated with the processing of FIG. 4.
Figure 5B:
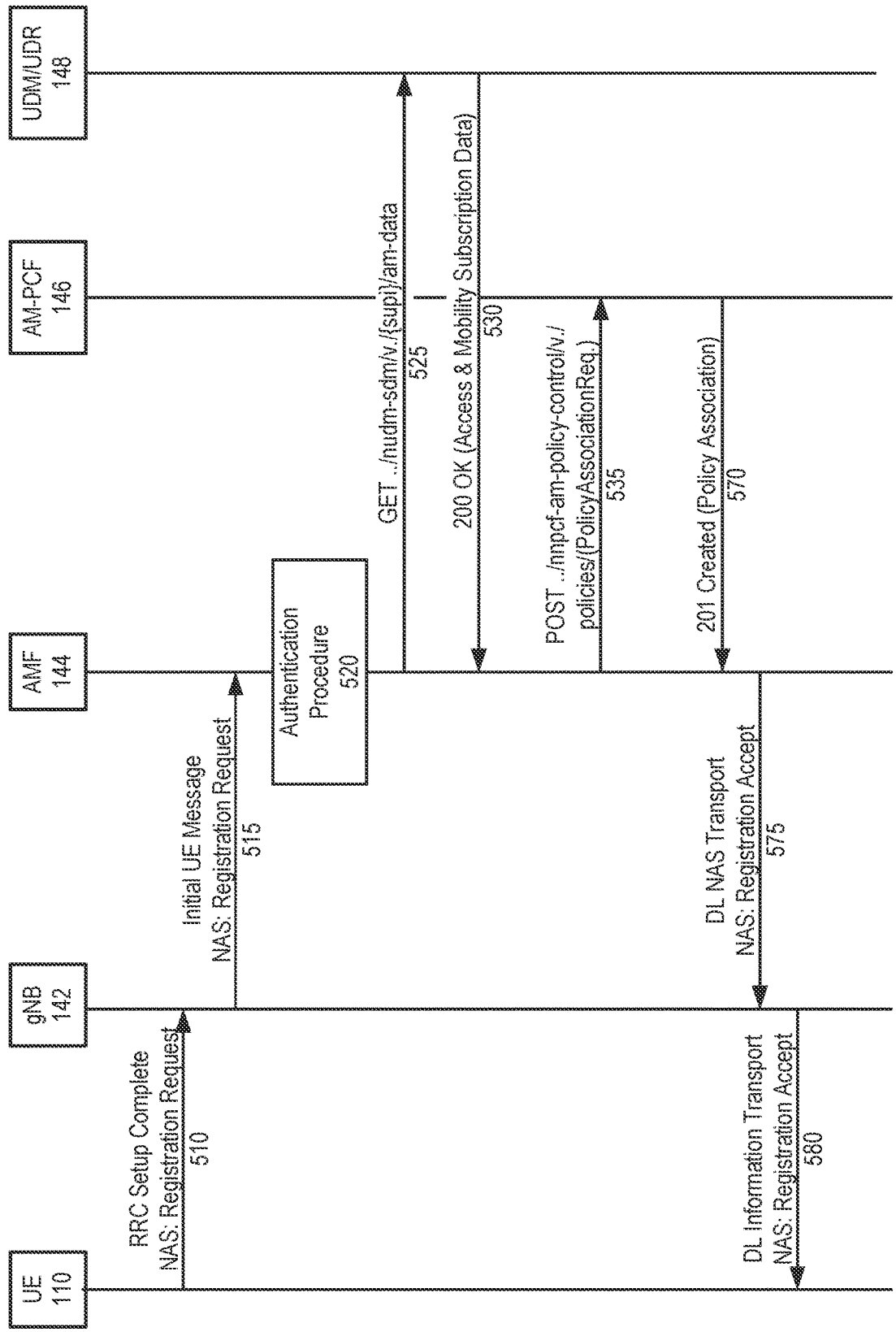

FIG. 4 is a flow diagram illustrating a process 400 associated with generating an access management decision for a registration process in accordance with an implementation. According to an implementation, process 400 may be performed, for example, by AMF 144. In other implementations, process 400 may be performed by AMF 144 in conjunction with one or more other devices of network portion 200. FIGS. 5A and 5B are signal flow diagrams illustrating exemplary signal flows associated with the processing of FIG. 4. More particularly, FIG. 5A illustrates a call flow when an AM-PCF returns an AM policy association error, and FIG. 5B illustrates a call flow when an AM-PCF returns a successful AM policy association.

As indicated in FIG. 4, processing may begin with AMF 144 receiving a UE registration request (block 410). As shown in both FIGS. 5A and 5B, UE device 110 may exchange registration request signaling with gNB 122 for access network 120. For example, UE 110 may initiate Radio Resource Control (RRC) session establishment with gNB 122 (message 510). In response, gNB 122 may select and register UE 110 with an appropriate AMF 144 (message 515). For example, gNB 122 may initiate an AMF selection process for servicing UE device 110.

Process 400 may further include performing an authentication procedure for the UE device (block 420). For example, using the selected AMF 144, gNB 122 and AMF 144 perform registration and authentication processing (message block 520). For example, AMF 144 may select an appropriate AUSF (not shown in FIG. 4) and may authenticate the registration request from UE 110 using the selected AUSF.

Process 400 may also include retrieving access and mobility subscription data for the UE device (block 430). For example, AMF 144 may query UDM/UDR 148 for AM policy data. AMF 144 may submit a HTTP GET request (e.g., GET ../nudm-sdm/v./{supi}/am-data) including the SUPI for UE device 110 (message 525). In other implementations, message 525 may include other various UE-related and/or subscriber information, such as its Internal Group identifier, subscription notification indication, Service Area Restrictions, RAT/frequency selection priority (RFSP) index, Allowed network slice selection assistance information (NSSAI), general public subscription identifier (GPSI), Access Type and RAT, permanent equipment identifier (PEI), and/or time zone. UDM/UDR 148 may retrieve the appropriate AM policy data including various UE-related and/or subscriber information, such as acceptable service areas (e.g., list of allowed/non-allowed tracking area identifiers (TAIs)), available bandwidth (e.g., radio access technology (RAT) frequency selection priority (RFSP)), etc. UDM/UDR 148 may provide an HTTP response (e.g., 200 OK) with the access and mobility subscription data (message 530).

Assuming a successful authentication procedure in block 420 and retrieval of access and mobility subscription data in block 430, process 400 may proceed to transmitting an access management policy request to AM-PCF 146 (block 440). For example, AMF 144 may submit to AM-PCF 146 a HTTP POST message (e.g., POST ../npcf-am-policy-control/v./policies/) with the policy association request (message 535).

Process 400 may include receiving a policy association response (block 450) and determining if a special error code is included in the response (block 460). For example, in response to message 535, AM-PCF 146 may retrieve/review provisioned policies to determine if there are any MNO policies that supersede/conflict subscription information for the AM policy data and return an appropriate message to AMF 144. For example, AM-PCF 146 may determine whether or not a UE is associated with an internal group identifier that is temporarily blocked. If AM-PCF 146 determines the AM Policy Association request needs to be rejected due to operator policy, AM-PCF 146 may return an HTTP message with an error code designated for a failed access management policy association (message 540, FIG. 5A). For example, message 540 may include a new policy association (PA) error code and ProblemDetails data structure. In one implementation, message 540 may include a payload in the message body with the PA error code and a problem description (e.g., "ProblemDetails"). According to an implementation, the problem description may include a new error information with in a standardized ProblemDetails format. Message 540 may include, for example, a cause attribute (e.g., policy association error), a barred until attribute (e.g., a timestamp when a policy bar is to be lifted), a UE-Message attribute (e.g., a default text message to be displayed on the UE, such as "5G network access is temporarily unavailable").

If AM-PCF 146 determines the AM Policy Association request is acceptable, AM-PCF 146 may create the policy association and return a policy association HTTP message (e.g., message 570, FIG. 5B). AMF 144 enforces the received AM policy decisions when determining whether to register UE 110.

If a special error code is included in the response (block 460—Yes), process 400 may include sending a registration reject message with a cause code (block 470). For example, as shown in FIG. 5A, AMF 144 may receive message 540 and, in response, generate a downlink (DL) NAS transport message 545. The DL NAS transport message 545 may include a registration reject indication with a unique NAS cause code (e.g., an NAS code that corresponds to the error code and ProblemDetails of the HTTP message in message 540). AMF 144 may provide DL NAS transport message 545 to gNB 122, which may forward the message to UE 110 as DL information transport message 550. The DL information transport message 550 may include the registration reject indication with the unique NAS cause code.

If a special error code is not included in the response (block 460—No), process 400 may include sending a registration accept message (block 480). For example, as shown in FIG. 5B, AMF 144 may receive message 570 and, in response, generate a downlink (DL) NAS transport message 575 to indicate the registration is accepted. AMF 144 may provide DL NAS transport message 575 to gNB 122, which may forward the message to UE 110 as DL information transport message 580.

Figure 6:
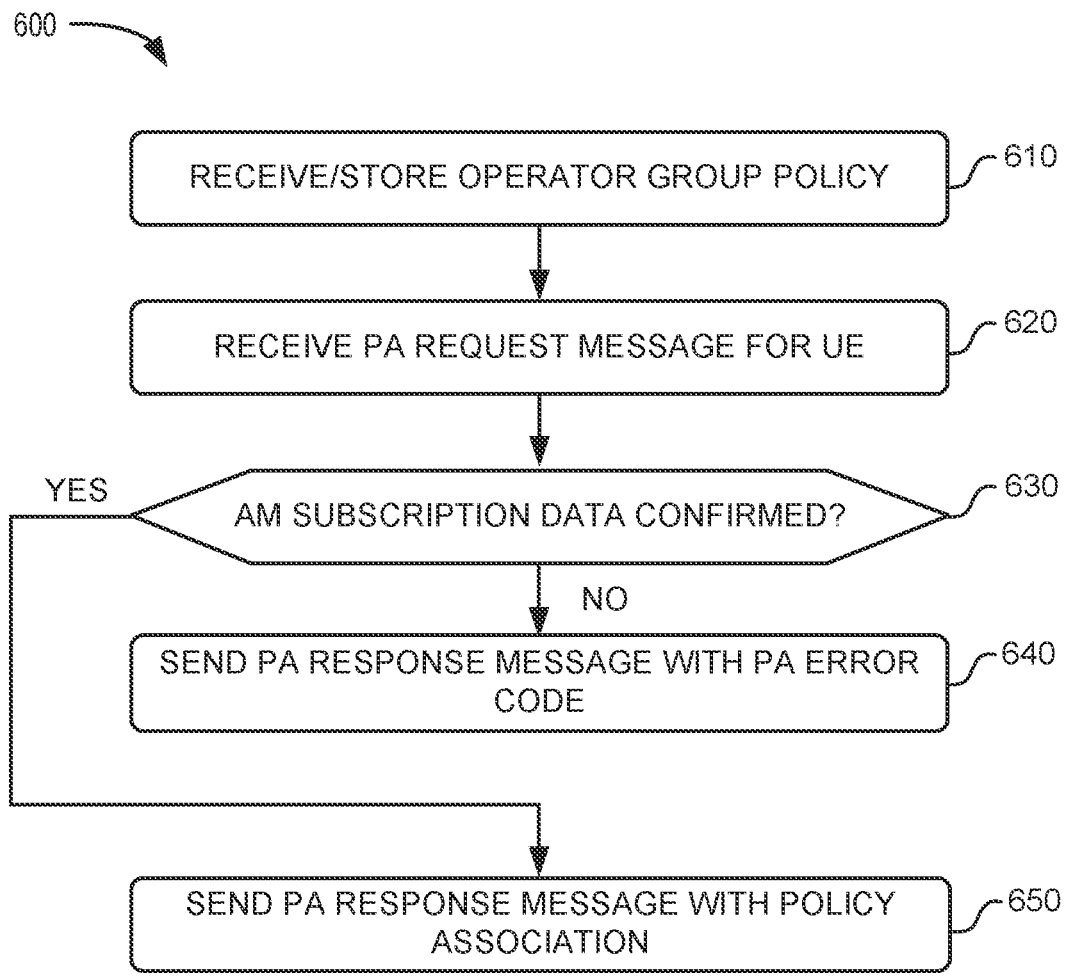
FIG. 6 is a flow diagram illustrating processing for creating access management policy associations for a UE device, in accordance with an implementation.

FIG. 6 is a flow diagram illustrating a process 600 associated with creating AM policy associations for a UE in accordance with an implementation. According to an implementation, process 600 may be performed, for example, by AM-PCF 146. In other implementations, process 600 may be performed by AM-PCF 146 in conjunction with one or more other devices of network portion 200.

Process 600 may include receiving and storing an operator group policy (block 610) and receiving a policy association (PA) request message (block 620). For example, AM-PCF 146 may be provisioned (e.g., by an MNO technician) with a group access management policy. The policy may, for example, temporarily restrict 5G network access in certain areas, limit certain 5G frequencies, etc. After storing the group policy, AM-PCF 146 may receive a policy association request message (e.g., message 535) from an AMF (e.g., AMF 144). The policy association request message may include access and mobility subscription data, for a registering UE device 110, that the AMF previously obtained from UDM/UDR 148.

Process 600 may also include determining if the access and mobility subscription data is confirmed (block 630). For example, AM-PCF 146 may confirm or override the access and mobility subscription data based on the previously provisioned operator group policy.

If the access and mobility subscription data is not confirmed (block 630—No), process 600 may include sending a policy association response message with a PA error code (block 640). For example, AM-PCF 146 may send to AMF 144 an HTTP error message that includes a PA error code with problem details for a failed AM Policy Association.

If the access and mobility subscription data is confirmed (block 630—Yes), process 600 may include sending a policy association response message with the requested policy association (block 650). For example, if the policy association request is not in conflict with the previously-provisioned operator group policy, AM-PCF 146 may create the policy association send confirmation to AMF 144.

According to implementations described herein, a 5G UE device registration process may be dynamically updated to reflect an operator policy. An AMF and AM-PCF in an enhanced core network may dynamically manage UE device registrations to confirm or override access and mobility subscription data based on certain policy criteria.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with AM-PCF 146 generating a policy decision based on provisioned policy and information provided by AMF 144. In other implementations, other network functions/elements (e.g., a non-split core PCF) may interface with AMF 144 to provide policy decision.

In addition, features have been described with respect to generating network policy decisions using elements in core network 130. In other implementations, similar processing may be performed in other portions of environment 100, such as in a Multi-access Edge Computing (MEC) platform located, for example, between access network 120 and core network 130. In still other implementations, a number of AM-PCFs 146 may be distributed in environment 100 to generate network policy decisions, as described above.

Further, while series of acts have been described with respect to FIGS. 4 and 6 and signal flows with respect to FIGS. 5A and 5B, the order of the acts and signal flows may be different in other implementations. Moreover, non-dependent acts may be implemented in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device in a core network, a registration request for a user equipment (UE) device;
retrieving, by the network device, access and mobility subscription data for the UE device;
submitting, by the network device, a policy association request message to an Access Management-Policy Control Function (AM-PCF),
wherein the policy association request message includes the access and mobility subscription data;
receiving, by the network device, a policy association response message from the AM-PCF;
determining, by the network device, if the policy association response message includes an error code for a failed access management policy association; and
sending, by the network device, a rejection message for the registration request when the policy association response message includes the error code,
wherein the rejection message includes an indication of the failed access management policy association.

2. The method of claim 1, wherein receiving the policy association response message includes:
receiving an error code designated for the failed access management policy association.

3. The method of claim 1, further comprising:
accepting, by the network device, the registration request when the policy association response message does not include the error code.

4. The method of claim 1, wherein sending the rejection message includes:
mapping, by the network device, the error code to a NAS error code; and
sending, by the network device, the NAS error code to the UE device.

5. The method of claim 1, wherein the network device comprises an access and mobility management function (AMF).

6. The method of claim 1, further comprising:
authenticating the UE device, in response to the registration request, before submitting the policy association request message.

7. The method of claim 1, further comprising:
receiving, by the AM-PCF, an operator group policy, wherein the operator group policy includes an access management policy for a group of subscribers;
receiving, by the AM-PCF, the policy association request message; and
rejecting, by the AM-PCF, a policy association request in the policy association request message based on the operator group policy.

8. The method of claim 7, further comprising:
sending, to the network device, the policy association response message with the error code.

9. The method of claim 7, further comprising:
sending, to the network device, the policy association response message via a Hypertext Transfer Protocol (HTTP).

10. A system, comprising:
at least one device configured to:
receive, in a core network, a registration request for a user equipment (UE) device;
retrieve access and mobility subscription data for the UE device;
submit a policy association request message to an Access Management-Policy Control Function (AM-PCF), wherein the policy association request message includes the access and mobility subscription data;
receive a policy association response message from the AM-PCF;
determine whether the policy association response message includes an error code for a failed access management policy association; and
send a rejection message for the registration request when the policy association response message includes the error code,
wherein the rejection message includes an indication of the failed access management policy association.

11. The system of claim 10, wherein the at least one device comprises an access and mobility management function (AMF).

12. The system of claim 10, wherein when retrieving the access and mobility subscription data, the at least one device is configured to:
retrieve the access and mobility subscription data from one of a Unified Data Management (UDM) function and/or a Unified Data Repository (UDR).

13. The system of claim 10, wherein the policy association response message includes an error code designated for the failed access management policy association.

14. The system of claim 10, wherein the at least one device is further configured to:
accept the registration request when the policy association response message does not include the error code.

15. The system of claim 10, wherein the at least one device is further configured to:
authenticate the UE device, in response to the registration request, before submitting policy association request message.

16. The system of claim 10, further comprising:
the AM-PCF configured to:
receive an operator group policy, wherein the operator group policy includes an access management policy for a group of subscribers;
receive the policy association request message; and
reject a policy association request in the policy association request message based on the operator group policy.

17. The system of claim 16, wherein the AM-PCF is further configured to:
send, to the network device, the policy association response message with the error code.

18. The system of claim 10, wherein, when sending the rejection message, the at least one device is further configured to:
map the error code to a NAS error code; and
send the NAS error code to the UE device.

19. A non-transitory computer-readable medium having stored thereon sequences of
instructions which, when executed by at least one processor, cause the at least one processor to:
receive, in a core network, a registration request for a user equipment (UE) device;
retrieve access and mobility subscription data for the UE device;
submit a policy association request message to an Access Management-Policy Control Function (AM-PCF),
wherein the policy association request message includes the access and mobility subscription data;
receive a policy association response message from the AM-PCF;
determine whether the policy association response message includes an error code for a failed access management policy association; and
send a rejection message for the registration request when the policy association response message includes the error code,
wherein the rejection message includes an indication of the failed access management policy association.

20. The non-transitory computer-readable medium of claim 19, wherein the instructions further cause the at least one processor to:
authenticate the UE device, in response to the registration request, before submitting policy association request message.

* * * * *